(12) United States Patent
Sawaguchi

(10) Patent No.: US 10,963,065 B2
(45) Date of Patent: Mar. 30, 2021

(54) ACTION PROCESSING APPARATUS

(71) Applicant: SCHNEIDER ELECTRIC JAPAN HOLDINGS LTD., Tokyo (JP)

(72) Inventor: Mamoru Sawaguchi, Osaka (JP)

(73) Assignee: SCHNEIDER ELECTRIC JAPAN HOLDINGS LTD., Tokyo (JP)

(*) Notice: Subject to any disclaimer, the term of this patent is extended or adjusted under 35 U.S.C. 154(b) by 0 days.

(21) Appl. No.: 16/580,287

(22) Filed: Sep. 24, 2019

(65) Prior Publication Data

US 2020/0097094 A1 Mar. 26, 2020

(30) Foreign Application Priority Data

Sep. 26, 2018 (JP) .............................. JP2018-180834

(51) Int. Cl.
 *G06F 3/01* (2006.01)
 *G06F 3/041* (2006.01)

(52) U.S. Cl.
 CPC ............ *G06F 3/017* (2013.01); *G06F 3/0412* (2013.01); *G06F 3/0414* (2013.01); *G06F 3/0416* (2013.01); *G06F 2203/04101* (2013.01)

(58) Field of Classification Search
 CPC ...... G06F 3/017; G06F 3/0412; G06F 3/0414; G06F 3/0416; G06F 3/042; G06F 3/0421; G06F 3/0425; G06F 3/0488; G06F 3/04886; G06F 2203/04101
 See application file for complete search history.

(56) References Cited

U.S. PATENT DOCUMENTS

| | | | |
|---|---|---|---|
| 2010/0177035 | A1 | 7/2010 | Schowengerdt et al. |
| 2011/0234639 | A1 | 9/2011 | Shimotani et al. |
| 2013/0111400 | A1* | 5/2013 | Miwa ...................... G06F 16/51 |
| | | | 715/808 |
| 2015/0116775 | A1 | 4/2015 | Yamashita et al. |

(Continued)

FOREIGN PATENT DOCUMENTS

JP 2016-119095 6/2016

OTHER PUBLICATIONS

Extended European Search Report and Written Opinion dated May 4, 2020 in corresponding European Patent Application No. 191990167.0.

(Continued)

*Primary Examiner* — Tom V Sheng
(74) *Attorney, Agent, or Firm* — Nixon & Vanderhye, P.C.

(57) ABSTRACT

A programmable display device (i) identifies a switch indicated by a pointing element based on one or two first detected values (in one or two of three directions of a three-dimensional space) of detected values indicative of the position of the pointing element in the three-dimensional space detected by a proximity sensor and (ii) detects a pressing action with respect to the switch based on a second detected value which is a value in another one of the three directions (pressing action detecting direction) other than the direction in which the switch was identified. The programmable display device calculates the amount of movement of the pointing element in the pressing action detecting direction based on a change in the second detected value, and determines whether or not the pressing action of the pointing element with respect to the switch is effective based on the amount of movement.

8 Claims, 8 Drawing Sheets

(56) References Cited

U.S. PATENT DOCUMENTS

| | | | |
|---|---|---|---|
| 2016/0054806 A1 | 2/2016 | Kosaka | |
| 2016/0253044 A1* | 9/2016 | Katz | G06F 3/04842 |
| | | | 345/156 |
| 2017/0168582 A1* | 6/2017 | Xu | G06F 3/017 |
| 2017/0195553 A1* | 7/2017 | Shiozaki | G06F 3/0488 |
| 2017/0235376 A1* | 8/2017 | Katz | G06F 3/0346 |
| | | | 345/158 |
| 2017/0249009 A1* | 8/2017 | Parshionikar | G06K 9/00315 |
| 2018/0107282 A1 | 4/2018 | Jeon et al. | |
| 2018/0136812 A1 | 5/2018 | Kim et al. | |
| 2018/0188817 A1 | 7/2018 | Iio et al. | |
| 2019/0265802 A1* | 8/2019 | Parshionikar | G06F 3/012 |

OTHER PUBLICATIONS

Partial European Search Report dated Jan. 22, 2020 in corresponding European Application No. 191990670.

* cited by examiner

ACTION PROCESSING APPARATUS

This Nonprovisional application claims priority under 35 U.S.C. § 119 on Patent Application No. 2018-180834 filed in Japan on Sep. 26, 2018, the entire contents of which are hereby incorporated by reference.

TECHNICAL FIELD

The present invention relates to an action processing apparatus that carries out a process in regard to a non-contact operation in which an operating action is carried out with respect to a screen in a non-contact manner.

BACKGROUND ART

Human-machine interfaces (HMI), such as programmable display devices, include: a display section that displays a screen; a touch panel via which touch input is received; an interface for communication with apparatuses connected to the HMI; and a control section that controls the above listed sections. Such an HMI receives, via the touch panel on the display section, manual input for giving control instructions or the like to the HMI.

In plant floors for machining, pharmaceutical production, food production, and the like, an HMI needs to be operated in a non-contact manner in some cases. For example, in plant floors for machining, an operator sometimes operates an HMI with working gloves on; however, if the HMI is operated by touching a display surface with greasy gloves, the display surface may become dirty. Furthermore, in plant floors for pharmaceutical or food production, operators are not allowed to touch products with the finger that touched the display surface (which is not in a sterile condition), from the hygiene point of view.

One way to address such issues would be to use a non-contact operation technology, examples of which are provided below.

For example, there are several existing techniques to emulate mouse operation or touch operation by detecting a gesture based on the results of eye-tracking or image analysis. According to such techniques, it is possible to operate an HMI almost as intended, with few malfunctions.

For example, Patent Literature 1 discloses detecting movement of a pointing element on a virtual touch panel in a non-contact manner. The virtual touch panel virtually corresponds to a screen of a display device. The movement of the pointing element on the virtual touch panel is detected by a distance sensor, and displayed on the real screen of the display device.

The distance sensor captures an image of a to-be-detected element with an infrared camera, by making use of infrared light emitted by an infrared LED and reflected at the to-be-detected element. The three-dimensional position coordinates of the pointing element (which is a measurement target) are calculated by an information processor by carrying out an image analysis of an image signal from the infrared camera.

Furthermore, gesture interfaces using an infrared proximity sensor have been increasingly employed in smartphones and car navigation systems. Such gesture interfaces are suitable for HMIs from the viewpoints of cost reduction, space saving, environmental resistance, required computing resource, and the like conditions.

Furthermore, speech input, which has made progress in recent years, could also be used in gesture detection.

CITATION LIST

Patent Literature

[Patent Literature 1]
Japanese Patent Application Publication, Tokukai, No. 2016-119095 (Publication date: Jun. 30, 2016)

SUMMARY OF INVENTION

Technical Problem

However, a technique to detect a gesture based on the results of eye-tracking or image analysis necessitates a large-scale, high-performance system. Thus, such a technique is not suitable for HMIs from the viewpoints of cost, installation space, processing performance of a processor, environmental resistance, and the like conditions.

Furthermore, many of the gesture interfaces which use an infrared proximity sensor are configured to be operated by a gesture such as swiping or pushing. Such gestures are not suited to accurately operating a to-be-operated object on a screen displayed on the display section, and thus are likely to cause malfunctions.

Moreover, speech input cannot yet be easily employed in an HMI from the viewpoints of noise tolerance and multi-lingualization.

For the reasons given so far, achieving non-contact operation of an HMI is difficult.

An object of an aspect of the present invention is to easily achieve non-contact operation of an HMI.

Solution to Problem

In order to attain the above object, an action processing apparatus in accordance with an aspect of the present invention includes: a display section configured to display one or more switches; a sensor section that is provided near the display section and that is configured to (i) detect a position of a pointing element in a three-dimensional space and (ii) output three detected values in three directions indicative of the position thus detected; a detecting section configured to (i) identify, based on one or two first detected values of the three detected values, one switch of the one or more switches that is indicated by the pointing element, the one or two first detected values being a value(s) in one or two of the three directions, the one or two of the three directions being referred to as at least one identification direction, and (ii) detect a pressing action with respect to the one switch based on a second detected value, the second detected value being a value in another one of the three directions other than the at least one identification direction, the another one of the three directions being referred to as a pressing action detecting direction; a calculating section configured to calculate an amount of movement of the pointing element in the pressing action detecting direction based on a change in the second detected value corresponding to a change in position of the pointing element in the pressing action detecting direction; and a determining section configured to (i) determine that the pressing action with respect to the one switch by the pointing element is effective if the amount of movement is within a predetermined amount range and (ii) determine that the pressing action is ineffective if the amount of movement is outside the predetermined amount range.

Advantageous Effects of Invention

An aspect of the present invention makes it possible to easily achieve non-contact operation of an HMI.

Figure 5:
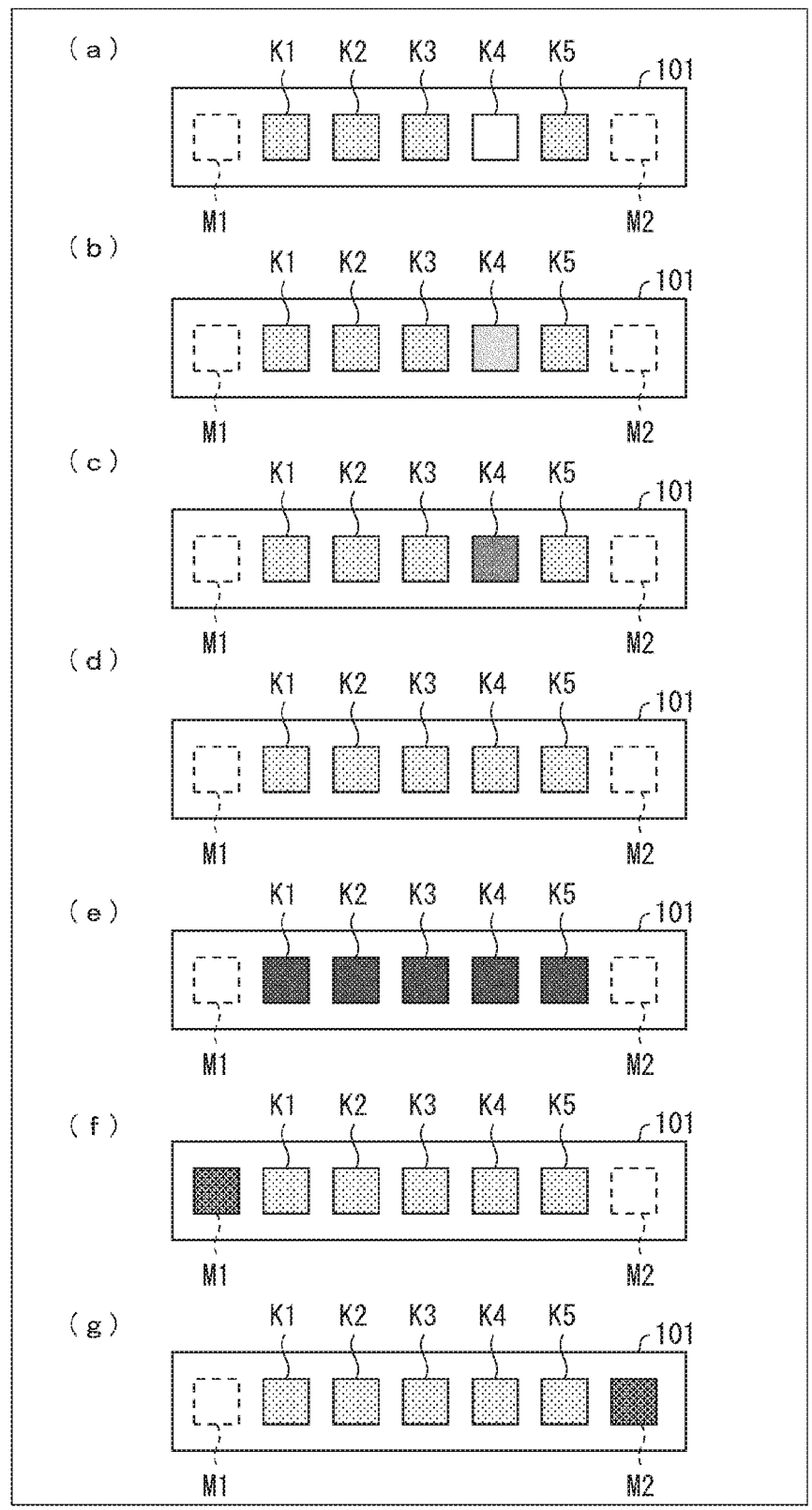

(a) to (g) of FIG. 5 illustrate display states of a switch screen provided on the main screen.

Figure 6:
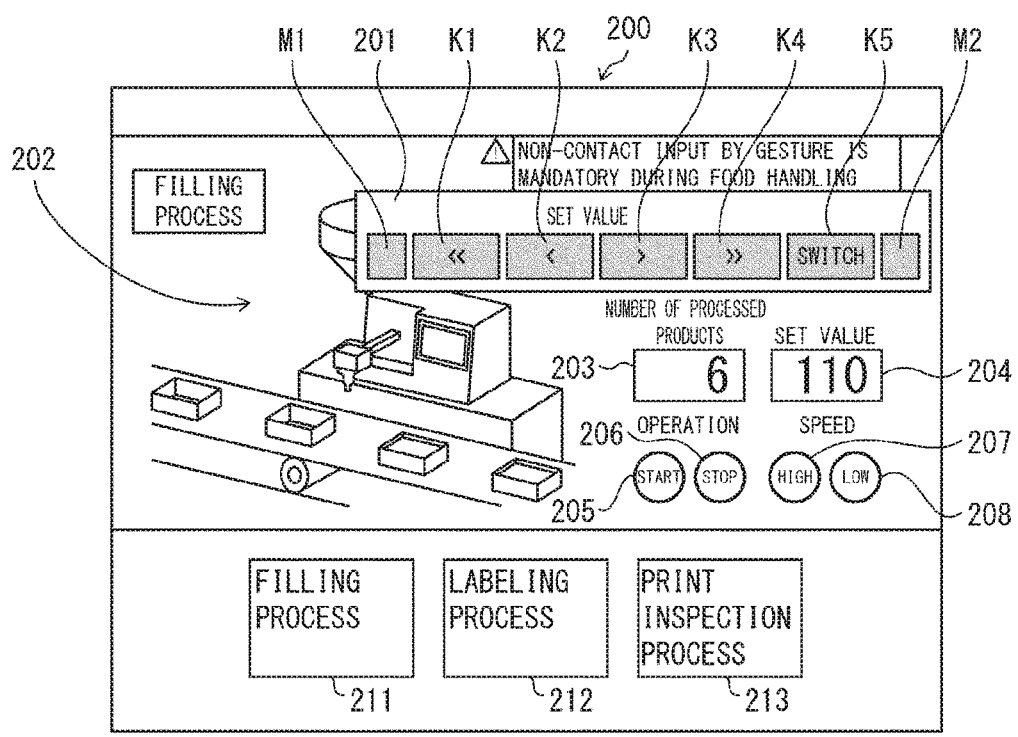

FIG. 6 illustrates a configuration of a main screen that is displayed on a display panel of a programmable display device of the control system and that shows a food production process.

Figure 7:
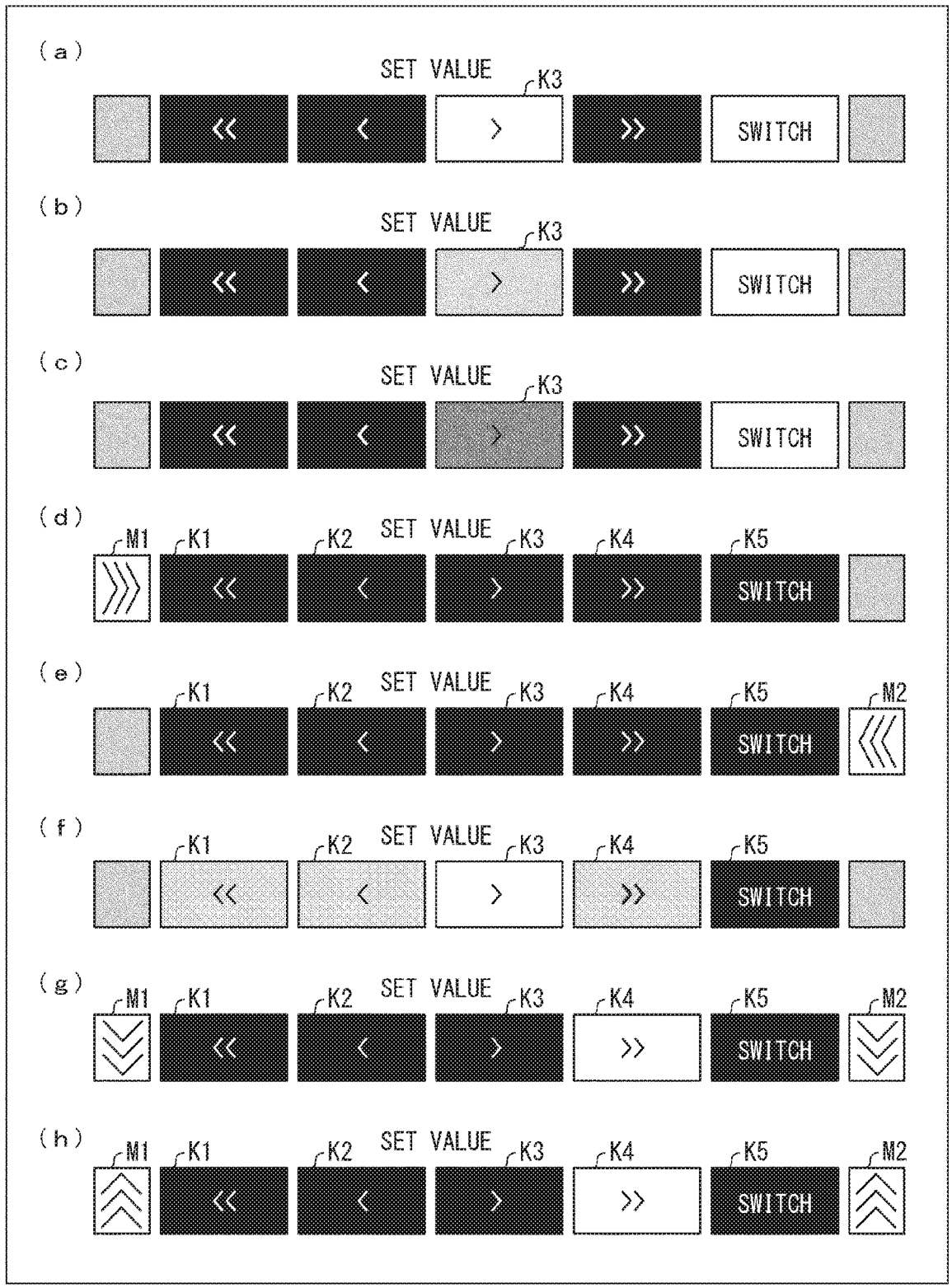

(a) to (h) of FIG. 7 illustrate display states of a switch screen displayed on the main screen illustrated in FIG. 6.

Figure 8:
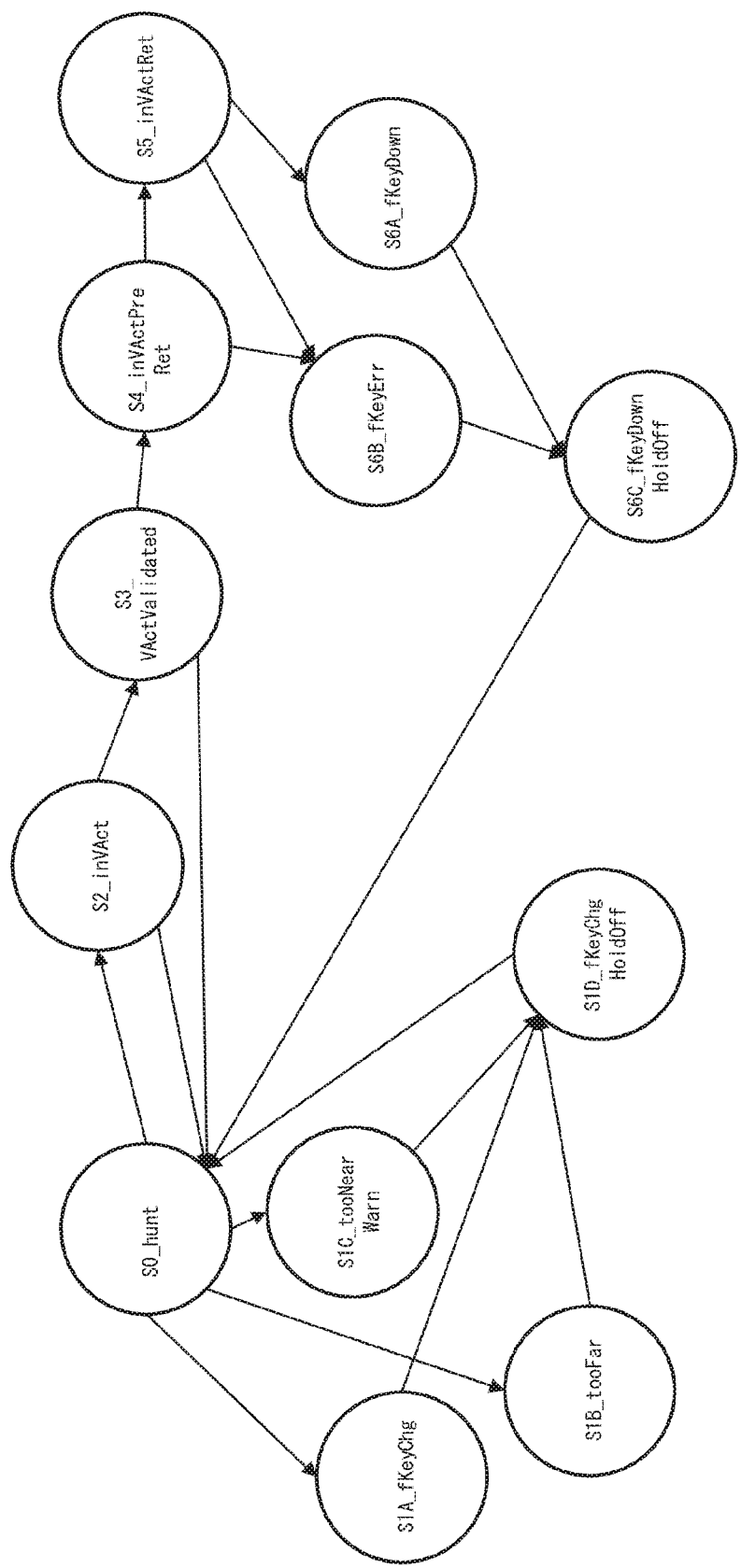

FIG. 8 is a state transition diagram illustrating possible states of control by a proximity action control section of the programmable display device.

DESCRIPTION OF EMBODIMENTS

Embodiment 1

The following description will discuss Embodiment 1 of the present invention with reference to FIGS. 1 to 5.

A control system in accordance with Embodiment 1 is discussed first.

Figure 1:
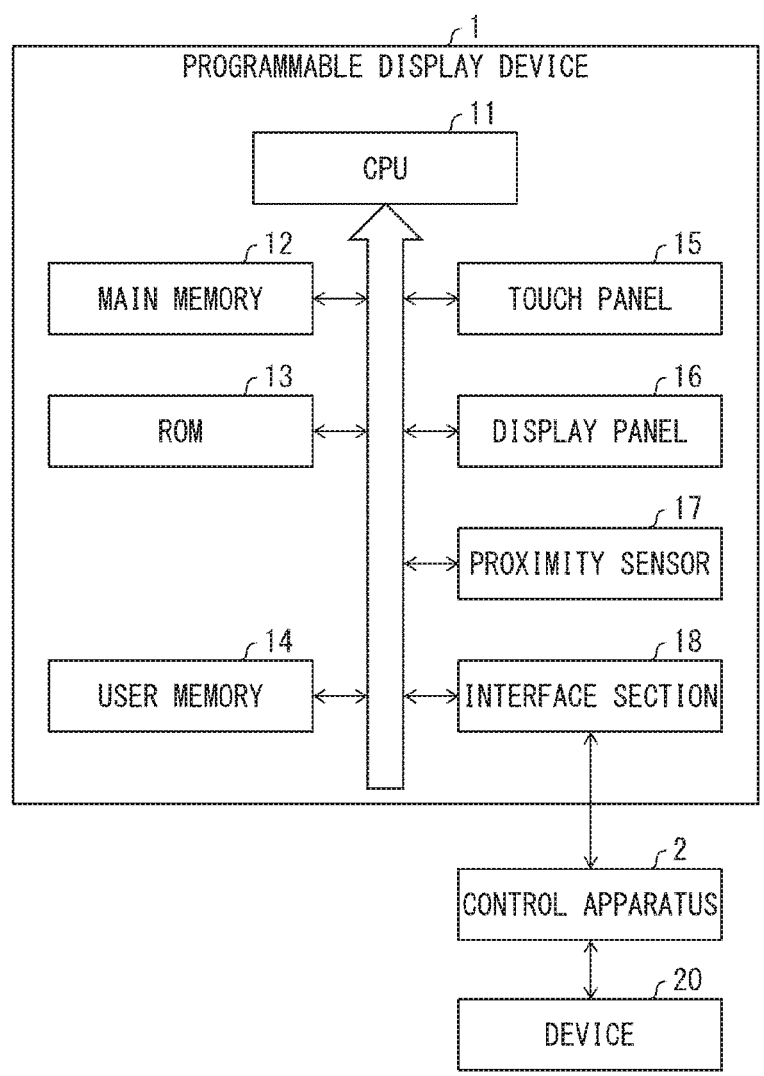
FIG. 1 is a block diagram illustrating a configuration of a control system in accordance with each embodiment of the present invention.

FIG. 1 is a block diagram illustrating a configuration of the control system in accordance with Embodiment 1.

Figure 2:
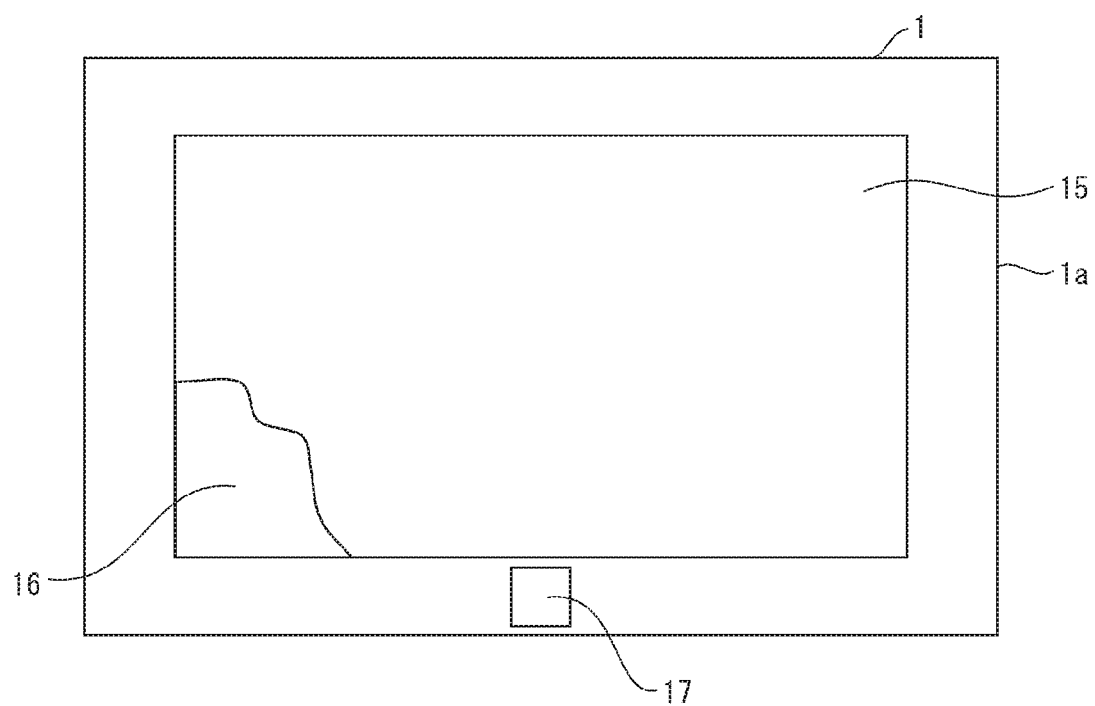
FIG. 2 is a front elevational view illustrating an outside configuration of a programmable display device of the control system.
Figure 3:
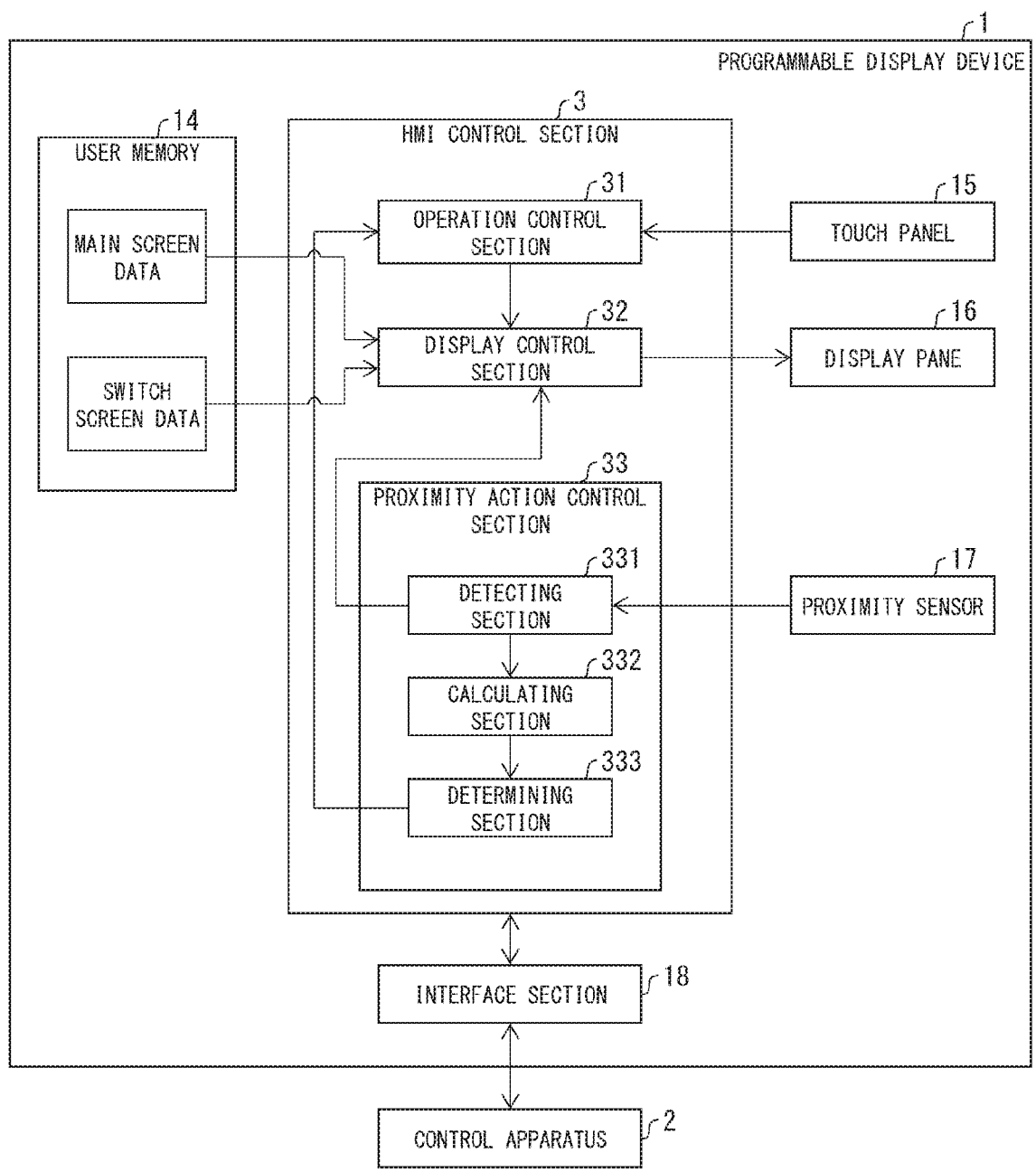
FIG. 3 is a block diagram illustrating a configuration of main parts of the programmable display device.
Figure 4:
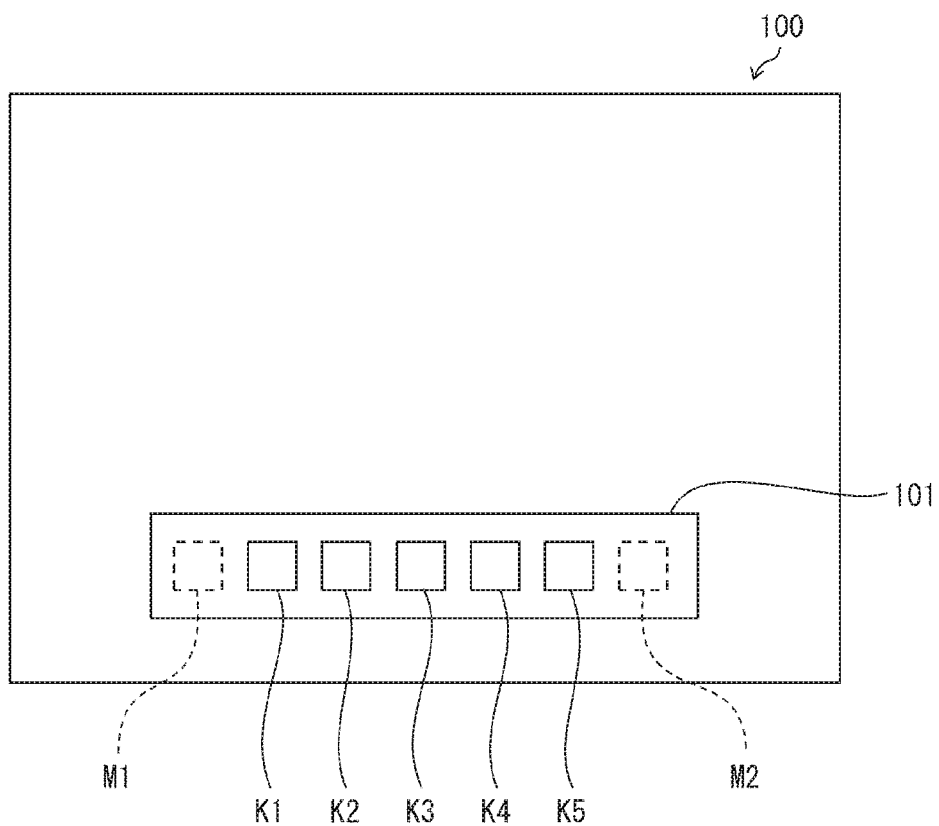
FIG. 4 illustrates a configuration of a main screen displayed on a display panel of the programmable display device.

FIG. 2 is a front elevational view illustrating an outside configuration of a programmable display device 1 of the control system. FIG. 3 is a block diagram illustrating a configuration of main parts of the programmable display device 1. FIG. 4 illustrates a configuration of a main screen 100 displayed on a display panel 16 of the programmable display device 1.

The programmable display device 1 (action processing apparatus) is an apparatus with a dedicated operating system (OS) embedded therein, and has the function of executing HMI programs for realizing various functions of the programmable display device 1. The programmable display device 1 is an HMI that has improved dust resistance, improved drip proofness, improved vibration resistance, and the like to withstand harsh conditions such as those in factories and plants.

The HMI programs are programs to realize various functions such as communication with external apparatuses, display of data acquired from the external apparatuses, and reception of input from an operator via an input device.

A hardware configuration of the programmable display device 1 is discussed first.

As illustrated in FIG. 1, the programmable display device 1 includes a central processing unit (CPU) 11, a main memory 12, a read only memory (ROM) 13, a user memory 14, a touch panel 15, a display panel 16 (display section), a proximity sensor 17, and an interface section 18.

The CPU 11 is a processing unit that executes the HMI programs. Specifically, the CPU 11 executes the HMI programs in the following manner: the CPU 11 receives data from the main memory 12, the user memory 14, the touch panel 15, the proximity sensor 17, and/or the like, carries out computation or processing with respect to the received data, and supplies the results of computation or processing to the main memory 12, the user memory 14, the display panel 16, and/or the like.

The main memory 12 is a memory that constitutes a main storage of the programmable display device 1, and is constituted by a dynamic random access memory (DRAM).

The ROM 13 has stored therein programs essential for operation of the programmable display device 1, such as a basic input output system (BIOS) that is executed when the programmable display device 1 is powered up or reset.

The user memory 14 is a large-capacity storage for storing data prepared by a user. The data prepared by the user are, for example: main screen data (described later) which is for use in displaying an HMI screen; switch screen data (described later) which is for use in displaying a switch screen that contains keys to be operated through the proximity sensor 17; and the like data. The user memory 14 is constituted by a flash erasable and programmable ROM (FEPROM) or the like.

As illustrated in FIG. 2, the touch panel 15 is disposed on the display panel 16. The touch panel 15 receives a touch action with respect to a screen displayed on the display panel 16, and outputs a touch signal as an input signal.

The display panel 16 displays an HMI screen based on the main screen data stored in the user memory 14. The display panel 16 is a flat display panel such as a liquid crystal display panel or an electroluminescent (EL) display panel.

As illustrated in FIG. 2, the touch panel 15 and the display panel 16 are fitted in a frame part 1a which is a front part of a housing of the programmable display device 1.

The proximity sensor 17 is a sensor to detect the position of a pointing element such as a finger. The proximity sensor 17 includes a light emitting part and a plurality of light receiving parts, and is configured such that: light emitted by the light emitting part is reflected at a pointing element and travels back to the light receiving parts; and the position of the pointing element is detected based on the amount of light received at each of the light receiving parts. Specifically, the proximity sensor 17 is an infrared proximity sensor that includes an infrared LED as the light emitting part and four photodiodes as the light receiving parts. The four photodiodes are sensitive in respective different directions: vertical directions (Y1 direction and Y2 direction); and horizontal directions (X1 direction and X2 direction). The proximity sensor 17 thus arranged is capable of measuring the degree of proximity of a to-be-detected element and displacements of the to-be-detected element in two orthogonal directions.

The proximity sensor 17 outputs, as detected data (measured values), three kinds of data (intensity of reflected light, horizontal angle of reflected light, and vertical angle of reflected light) calculated based on x1, x2 (data in horizontal direction) and y1, y2 (data in vertical direction). These detected data are non-linear data; therefore, the detected data is difficult to use as-is for determination of the position of the pointing element. To address this, a computation to convert the detected data into three-dimensional coordinates, based on the interrelationship between the three kinds of detected data and on an appropriately selected constant, is carried out. This makes it possible to convert the detected data into detected values represented by X, Y and Z coordinates in which distortion is reduced to some extent. In Embodiment 1, a combination of the proximity sensor 17 and a processing section that has the function of the above computation is referred to as a sensor section. The processing section may be contained in the proximity sensor 17 or included in an HMI control section 3 (described later).

The proximity sensor 17 emits infrared light, for example, in a manner such that the intensity is substantially uniform over a spherical plane (or ellipsoidal plane) and such that the area of the spherical plane with the uniform intensity increases (intensity decreases) with increasing distance from the proximity sensor 17. With this, the range within which the position of the pointing element is detectable becomes narrower with decreasing distance to the proximity sensor 17 and becomes broader with increasing distance from the proximity sensor 17.

As illustrated in FIG. 2, the proximity sensor 17 is embedded at a predetermined position in the frame part 1a such that the proximity sensor 17 is positioned near the display panel 16. The position of the proximity sensor 17 is preferably the center of a bottom portion of the frame part 1a as illustrated in FIG. 2, because such a position allows an operator to easily carry out operations regardless of which hand is dominant. Alternatively, the proximity sensor 17 may be configured to be capable of being attached to the outer peripheral surface of the frame part 1a. With this, the proximity sensor 17 can be attached to the programmable display device 1 in a supplemental manner as an optional part.

Although the proximity sensor 17 is not limited to the infrared proximity sensor, the infrared proximity sensor is most suitable as a sensor to detect an action with respect to a key, from the viewpoints of function, structure, and the like.

The interface section 18 is a connector section for communicable connection with a control apparatus 2. The interface section 18 is equipped with several kinds of interface such as a serial interface and local area network (LAN).

The control apparatus 2 is an external apparatus such as a programmable logic controller (PLC), a temperature controller, or an inverter, and has the function of communicating with the programmable display device 1. The control apparatus 2 exchanges data with a device 20. Examples of the device 20 include: input devices such as sensors and switches; and output devices such as actuators, relays, solenoid valves, and indicators.

Next, a system configuration of the programmable display device 1 is discussed.

As illustrated in FIG. 3, the programmable display device 1 includes the HMI control section 3 as a section that has a control function.

The HMI control section 3 is a section that has an HMI function, and is realized by the CPU 11 executing the HMI programs.

As used herein, the term "HMI function" refers to the function that includes (i) generation of an instruction to the control apparatus 2 in accordance with a user's input, (ii) acquisition of various kinds of data from the control apparatus 2, and (iii) display of an HMI screen in which the acquired data is displayed and via which the user's input is received. The HMI control section 3 includes, as the HMI function: an operation control section 31 that controls various sections in accordance with the user's input and in accordance with changes in data stored in the control apparatus 2; and a display control section 32 that controls display of the HMI screen. The HMI control section 3 also includes a proximity action control section 33 that controls various sections in accordance with a gesture input by a user carried out in a non-contact manner through the proximity sensor 17.

The HMI screen is a screen that contains various objects. The objects show the status of the device 20 that is connected to the control apparatus 2 and receive an action with respect to the touch panel 15. Examples of the objects contained in the HMI screen include graphical representations of lamps, data indicators, and switches (such graphical representations are hereinafter referred to as "component images"). Screen data for use in displaying such an HMI screen is prepared on a personal computer or the like and stored in the user memory 14.

The operation control section 31 generates an operation instruction that corresponds to a user's touch input with respect to the touch panel 15. The operation control section 31 also generates an operation instruction that corresponds to a key-pressing action that has been determined as effective by a determining section 333 (described later) of the proximity action control section 33. Examples of these operation instructions include: instructions to start/stop the control apparatus 2; instructions to change control data supplied to the control apparatus 2; and instructions to switch screens. The operation control section 31 also generates control instructions in accordance with changes in data in the control apparatus 2. Examples of the control instructions include instructions to switch screens.

The display control section 32 carries out a control process that causes the display panel 16 to display the HMI screen based on the main screen data. The display control section 32 also carries out a process of causing the HMI screen to display data acquired from the control apparatus 2 via the interface section 18. The display control section 32 carries out a process of, for example, turning on or off the foregoing lamp image, causing the foregoing data indicator image to indicate data, in the HMI screen. The display control section 32 also carries out a process of changing the state of the HMI screen in accordance with the operation instructions. The display control section 32 carries out a process of, for example, receiving the foregoing operation instruction to operate the foregoing switch image and changing the display state (color, shape, etc.) of the switch image. The display control section 32 also carries out a process of switching HMI screens in accordance with a user's operation.

The proximity action control section 33 detects, based on the position of a pointing element detected by the proximity sensor 17, movement of the pointing element associated with a user's gesture with respect to the switch screen, and, based on the result of the detection, determines whether the gesture indicates a key on the switch screen and whether the gesture is effective as an action of pressing the key. If it is determined that the gesture indicates a key and that the gesture is effective as an action of pressing the key, the proximity action control section 33 notifies the operation control section 31 that the key has received the pressing action, together with the position coordinates of the key or the like. The proximity action control section 33 also provides the display control section 32 with an instruction related to displaying a switch screen based on the result of the detection by the proximity sensor 17. To achieve this function, the proximity action control section 33 includes a detecting section 331, a calculating section 332, and the determining section 333.

The detecting section 331 identifies a key that is indicated by the pointing element, based on one or two (i.e., one or two first detected values) of three detected values in respective three directions (X direction, Y direction, and Z direction) of a three-dimensional space. The three detected values are outputted by the proximity sensor 17. The one or two first detected values are one or two values in one or two of the three directions. The detecting section 331 also detects a key-pressing action based on another one (second detected value) of the detected values, which is a value in another one of the three directions other than the direction(s) in which the key was identified (such a direction(s) is/are referred to as at least one identification direction). The three directions preferably intersect one another at right angles, but do not need to intersect at right angles and may slightly deviate from the right angles.

Specifically, in a case where keys in a switch screen are arranged in a one-dimensional manner such as being arranged in, for example, a line horizontally or vertically, the detecting section 331 (i) carries out key identification based on the first detected value that is in one of the three directions and (ii) detects a key-pressing action based on the second detected value that is in one of the other two directions. In a case where keys in the switch screen are arranged in a two-dimensional manner such as being arranged in two or more lines, the detecting section 331 (i) carries out key identification based on the first detected values that are in two of the three directions and (ii) detects a key-pressing action based on the second detected value that is in the remaining one of the three directions.

The calculating section 332 calculates the amount and speed of movement of the pointing element in the direction in which the pressing action of the pointing element is carried out, based on a change in the second detected value corresponding to a change in position of the pointing element in the direction in which the pressing action of the pointing element is detected (such a direction is referred to as pressing action detecting direction).

The determining section 333 determines that the key-pressing action of the pointing element is effective if the amount of movement is within a predetermined amount range. The determining section 333 notifies the operation control section 31 of the pressing action that has been determined as effective. On the contrary, the determining section 333 determines that the key-pressing action of the pointing element is ineffective if the amount of movement is outside the predetermined amount range (not within the predetermined amount range).

Alternatively, the determining section 333 may determine that the key-pressing action of the pointing element is effective if the amount of movement is within the predetermined amount range and the speed of movement is within a predetermined speed range. The determining section 333 may determine that the key-pressing action of the pointing element is ineffective if the amount of movement is outside the predetermined amount range (not within the predetermined amount range) or the speed of movement is outside the predetermined speed range (not within the predetermined speed range).

In cases where the number of the foregoing identification directions is two, the determining section 333 determines that the pressing action is effective if the amount of displacement of the pointing element in each of the two identification directions is equal to or less than a corresponding predetermined value. Alternatively, in cases where the number of the identification directions is one, the determining section 333 may determine that the pressing action is effective if the amount of displacement of the pointing element in that one identification direction is equal to or less than a predetermined value. The determining section 333 may or may not use the remaining one of the three directions that is not related to the key identification or the key-pressing action to carry out the determination.

In a case where the key identification is carried out based on the movement of the pointing element in the identification direction and the detection of the key-pressing action is carried out based on the movement of the pointing element in the pressing action detecting direction, the remaining one of the three directions is related to neither the key identification nor the key-pressing action. For example, assume that the direction that is related to neither the key identification nor the key-pressing action is a front-back direction and that the vertical direction is the pressing action detecting direction. In this case, if the pointing element moves diagonally downward with respect to the front-back direction, such a diagonally downward movement of the pointing element is decomposed into a forward component and a downward component. This downward component may be determined as a downward displacement and, as a result, the movement of the pointing element may be regarded as a pressing action. In view of this, the accuracy of determination can be increased by also using, in the determination, the movement of the pointing element in the direction related to neither the key identification nor the key-pressing action.

The determining section 333 determines whether an action with respect to, for example, an alternate key that switches from OFF state to ON state upon a single pressing action is effective or not. Specifically, the determining section 333 determines that the pressing action is effective if the difference between the position of the pointing element immediately before carrying out the pressing action and the position of the pointing element which has completed the pressing action and has moved back, in the pressing action detecting direction, is within a predetermined difference range. The determining section 333 may determine that the pressing action is ineffective if the above difference is outside the predetermined difference range. Note that the determining section 333 may determine that the pressing action is effective in a case where the pointing element has moved back to the position where it used to be present immediately before carrying out the pressing action, in the pressing action detecting direction, and the pointing element has held still for a certain period of time at that position.

Incidentally, the display control section 32 carries out a control process that causes the display panel 16 to display a switch screen based on the switch screen data.

For example, as illustrated in FIG. 4, a switch screen 101 is displayed at a predetermined position superimposed on the main screen 100. The switch screen 101 is in the shape of a rectangle, and includes: marks M1 and M2 at the opposite ends thereof; and a plurality of (in Embodiment 1, five) keys K1 to K5 arranged horizontally in a line (one-dimensional manner) in a concentrated manner between the marks M1 and M2. The number of keys included in the switch screen 101 may be one.

The keys K1 to K5 are configured as alternate switches each of which turns ON upon a single pressing action and turns OFF upon the next pressing action. The mark M1 serves to present a caution that the pointing element is positioned outside, to the left, of a range within which the keys K1 to K5 are to be indicated by the pointing element. The mark M2 serves to present a caution that the pointing element is positioned outside, to the right, of the range within which the keys K1 to K5 are to be indicated by the pointing element.

Within the switch screen 101, the keys K1 to K5 are arranged in a line (one-dimensional manner); however, this does not imply any limitation. The keys K1 to K5 may be arranged in two or more lines (in a two-dimensional manner). The shape of the switch screen 101 is not limited to a rectangle (quadrangle), and may be a circle, an oval, a polygon, or the like. The number of keys is not limited to five, as well.

Next, the following description will discuss how the programmable display device 1 operates when the keys K1 to K5 on the switch screen are operated in a non-contact manner by gestures through use of the proximity sensor 17.

(a) to (g) of FIG. 5 illustrate display states of the switch screen 101 provided on the main screen 100.

It should be noted that the following description is based on the assumption that a direction along which the keys K1 to K5 are selected (horizontal direction) is X direction, a direction along which an action with respect to one of the keys K1 to K5 is carried out (vertical direction) is Y direction, and Z direction is not used.

Although the following description is based on the assumption that the pointing element is an operator's finger (fingertip), the pointing element is not limited to a finger, and may be a fist. Other examples of the pointing element other than parts of the human body include pens and styluses. In a case where a first is used as the pointing element, the protruding portion of the first that is nearest a key is detected as the pointing element by the proximity sensor 17.

The display control section 32 instructs the display panel 16 to display the switch screen 101 at a predetermined position of the main screen 100, based on switch screen data. With this, the switch screen 101 is displayed at a predetermined position of the main screen 100 as illustrated in FIG. 4.

When the pointing element is present within the detection range covered by the proximity sensor 17, the detected values outputted by the proximity sensor 17 are non-linear values that correspond to points on a plurality of equi-intensity pseudo-ellipsoidal surfaces and the sizes of the pseudo-ellipsoidal surfaces. Therefore, the detecting section 331 carries out calculation to convert the values to the position of the pointing element defined by three orthogonal spatial coordinates. This calculation is similar to a known projective transformation by which the spatial position of an object is re-constructed from an image captured using a fisheye lens, and is carried out using an elementary function and an appropriately selected constant.

When the pointing element reaches a position that indicates the key K4, the detecting section 331 identifies the key K4 based on a position indicated by the pointing element in the X direction. The display control section 32 controls the display panel 16 to display the key K4 in a color that is indicative of selected state (e.g., yellow), based on the position of the identified key K4. With this, the key K4 is displayed in yellow as illustrated in (a) of FIG. 5.

When the pointing element moves vertically downward (in the Y direction) from the above condition and moves back to substantially the position where it was located before, the calculating section 332 receives, from the detecting section 331, a detected value in the direction in which the pointing element moved, and calculates the amount and speed of the movement of the pointing element based on the detected value. The calculating section 332 here may calculate only the amount of movement if the amount of movement of the pointing element alone is used in the determination by the determining section 333.

The determining section 333 determines that the pointing element's action with respect to the key K4 is effective (KeyDown event is fired) if the amount of movement calculated by the calculating section 332 is within a predetermined amount range. Alternatively, the determining section 333 may determine that the pointing element's action with respect to the key K4 is effective if the calculated amount of movement is within the predetermined amount range and the calculated speed of movement is within a predetermined speed range.

If it is determined that the pointing element's action with respect to the key K4 is effective, the display control section 32 controls the display panel 16 to display the key K4 in a color that is indicative of operated state (e.g., green). With this, the key K4 is displayed in green as illustrated in (b) of FIG. 5.

On the contrary, the determining section 333 determines that the pointing element's action with respect to the key K4 is ineffective if the amount of movement calculated by the calculating section 332 is not within the predetermined amount range. Alternatively, the determining section 333 may determine that the pointing element's action with respect to the key K4 is ineffective if the calculated amount of movement is not within the predetermined amount range or the calculated speed of movement is not within a predetermined speed range.

If it is determined that the pointing element's action with respect to the key K4 is ineffective, the display control section 32 controls the display panel 16 to display the key K4 in a color that is indicative of inoperable state (e.g., red). With this, the key K4 is displayed in red as illustrated in (c) of FIG. 5.

When the pointing element is present outside the detection range covered by the proximity sensor 17 and is too far from the proximity sensor 17, the display control section 32 controls the display panel 16 to display the keys K1 to K5 in a color that is indicative of undetectable state (e.g., gray), based on the detected values supplied from the detecting section 331. With this, the keys K1 to K5 are displayed in gray as illustrated in (d) of FIG. 5.

Even if the pointing element is within the detection range covered by the proximity sensor 17, when the pointing element is too close to the proximity sensor 17, a user should be notified that the pointing element is too close to the proximity sensor 17 so that the pointing element will be able to avoid touching the proximity sensor 17. The display control section 32 controls the display panel 16 to display the keys K1 to K5 in a color that is indicative of inoperable state (e.g., orange), based on the detected values from the detecting section 331. With this, the keys K1 to K5 are displayed in orange (warning color) as illustrated in (e) of FIG. 5.

When the pointing element is positioned outside, to the left, of the detection range covered by the proximity sensor 17, the display control section 32 controls the display panel 16 to display the mark M1 in a color indicative of ON state (e.g., orange) based on the detected values supplied from the detecting section 331. With this, the mark M1 is displayed in orange (warning color) as illustrated in (f) of FIG. 5.

On the contrary, when the pointing element is positioned outside, to the right, of the detection range covered by the proximity sensor 17, the display control section 32 controls the display panel 16 to display the mark M2 in a color indicative of ON state (e.g., orange) based on the detected values supplied from the detecting section 331. With this, the mark M2 is displayed in orange as illustrated in (g) of FIG. 5.

It should be noted that, in regard to the Z direction, even if the position of the pointing element in the Z direction changes, provided that the change is within a predetermined detection range, the operator's feeling of operating keys can be maintained substantially the same by adjusting the multiplying factor for the detected values in the X and Y directions. This is also apparent from the fact that, as the pointing element becomes closer to the proximity sensor 17, the detection range becomes narrower (in terms of angle, the angle becomes larger), and therefore movements in the X and Y directions result in larger detected values (detected more dynamically). Even assuming equal amounts (1 cm) of movement of the pointing element, the angle differs depending on the distance in the Z direction from the proximity sensor 17. To address this, large values resulting from small movements of the pointing element are adjusted by an adjustment factor that differs from one position in the Z direction to another. This makes it possible to absorb variations that result from differences in distance from the proximity sensor 17.

Next, the following description discusses how the programmable display device 1 operates when the keys K1 to K5 in the switch screen displayed on the main screen are operated in a process of food production.

FIG. 6 illustrates a configuration of a main screen that is displayed on the display panel 16 of the programmable display device 1 and that shows a food production process. (a) to (h) of FIG. 7 illustrate display states of a switch screen 201 displayed on the main screen illustrated in FIG. 6.

The display control section 32 causes the display panel 16 to display a main screen 200 illustrated in FIG. 6.

The main screen 200 is a screen that shows a process of food production. The main screen 200 contains the switch screen 201, a process image 202, a number-of-products indicator 203, a set value indicator 204, a start switch 205, a stop switch 206, a high-speed operation selecting switch 207, a low-speed operation selecting switch 208, and process selecting switches 211 to 213.

The switch screen 201 contains keys K1 to K5 and marks M1 and M2. The keys K1 to K5 and marks M1 and M2 are arranged in a concentrated manner in the switch screen 201 in the same manner as the keys K1 to K5 and marks M1 and M2 of the foregoing switch screen 101.

The key K1 is provided to carry out an operation of reducing the set value shown in the set value indicator 204 (described later) in decrements of two or more per key operation. The key K2 is provided to carry out an operation of reducing the set value in decrements of one. The key K3 is provided to carry out an operation of increasing the set value in increments of one. The key K4 is provided to carry out an operation of increasing the set value in increments of two or more per key operation. The key K5 is provided to carry out an operation of switching the switch screen 201 to another switch screen 201.

Other examples of the switch screen 201 include: switch screens each containing keys that are substantially equal in function to the start switch 205, the stop switch 206, the high-speed operation selecting switch 207, and the low-speed operation selecting switch 208, respectively; and switch screens each containing keys that are substantially equal in function to the process selecting switches 211 to 213.

The process image 202 is an image that shows a production process selected via the process selecting switch 211. In the example illustrated in FIG. 6, the process image 202 shows a filling process.

The number-of-products indicator 203 is a component image representing a numerical indicator that is provided to indicate the number of processed products. The set value indicator 204 is a component image representing a numerical indicator that is provided to receive input of the set value indicative of the target number of products and to indicate the set value. Upon the set value indicator 204 being touched, the display control section 32 controls a numeric keypad to be displayed on the main screen 200, which enables input of numbers via the numeric keypad.

The start switch 205 is a component image representing an operation switch by which an instruction to start the operation of a filling machine is made. The stop switch 206 is a component image representing an operation switch by which an instruction to stop the operation of the filling machine is made.

The high-speed operation selecting switch 207 is a component image representing an operation switch by which the high-speed operation of the filling machine is selected. The low-speed operation selecting switch 208 is a component image representing an operation switch by which the low-speed operation of the filling machine is selected.

The process selecting switch 211 is a component image representing a changeover switch by which display is switched to the main screen 200 of the filling process. The process selecting switch 213 is a component image representing a changeover switch by which display is switched to a main screen that represents a labeling process (this screen is not illustrated). The process selecting switch 212 is a component image representing a changeover switch by which display is switched to a main screen that represents a print inspection process (this screen is not illustrated).

The set value indicator 204, the start switch 205, the stop switch 206, the high-speed operation selecting switch 207, the low-speed operation selecting switch 208, and the process selecting switches 211 to 213, in the main screen 200, function as touch switches that receive touch input.

In a case where an operator carries out usual operations via the touch panel 15, the operator operates the set value indicator 204, the start switch 205, the stop switch 206, the high-speed operation selecting switch 207, the low-speed operation selecting switch 208, the process selecting switches 211 to 213, and the like provided on the main screen 200.

In the foregoing example illustrated in FIG. 5, the switch screen 101 is always displayed on the main screen 100. On the contrary, on the main screen 200, the switch screen 201 is not displayed while usual touch input is being carried out, because the proximity sensor 17 does not detect the pointing element while usual touch input is being carried out.

In a case where an operator operates the switch screen 201 with a gesture, the operator places his/her finger closer to the proximity sensor 17. When the detected values of the position of the pointing element detected by the detecting section 331 enter the detection range, the display control section 32 instructs the display panel 16 to display the switch screen 201 at a predetermined position on the main screen 200. With this, the switch screen 201 is displayed.

When the pointing element is outside the detection range covered by the proximity sensor 17 and is too far from the proximity sensor 17, the display control section 32 controls the display panel 16 to stop displaying the switch screen 201, based on the detected values supplied from the detecting section 331. With this, the switch screen 201 disappears from the main screen 200.

It should be noted that, in FIG. 7 that is referenced in the following description, only the keys K1 to K5 and marks M1 and M2 arranged in the switch screen 201 are illustrated, for convenience of illustration.

When the pointing element reaches a position that indicates the key K3 under the condition in which the switch screen 201 is displayed, the detecting section 331 identifies the key K3. The display control section 32 controls the display panel 16 to display the key K3 in a color that is indicative of selected state (e.g., yellow). With this, the key K3 is displayed in yellow as illustrated in (a) of FIG. 7.

When the pointing element moves vertically downward in Y direction from the above condition and moves back to substantially the position where it was located before, the calculating section 332 calculates the amount and speed of the movement of the pointing element.

The determining section 333 determines that the pointing element's action with respect to the key K3 is effective (KeyDown event is fired) if the amount of movement calculated by the calculating section 332 is within a predetermined amount range. Alternatively, the determining section 333 may determine that the pointing element's action with respect to the key K3 is effective if the calculated speed of movement is within a predetermined speed range.

If such a determination is made, the display control section 32 controls the display panel 16 to display the key K3 in a color that is indicative of operated state (e.g., green). With this, the key K3 is displayed in green as illustrated in (b) of FIG. 7.

On the contrary, the determining section 333 determines that the pointing element's action with respect to the key K3 is ineffective if the amount of movement calculated by the calculating section 332 is not within the predetermined amount range. Alternatively, the determining section 333 may determine that the pointing element's action with respect to the key K3 is ineffective if the calculated amount of movement is not within the predetermined amount range or the calculated speed of movement is not within a predetermined speed range.

If such a determination is made, the display control section 32 controls the display panel 16 to display the key K3 in a color that is indicative of inoperable state (e.g., red). With this, the key K3 is displayed in red as illustrated in (c) of FIG. 7.

When the pointing element is positioned outside the detection range covered by the proximity sensor 17 to the left of the detection range, the display control section 32 controls the display panel 16 to display the mark M1 in a color indicative of ON state (e.g., orange) based on the detected values supplied from the detecting section 331. With this, the mark M1 is displayed in orange (warning color) as illustrated in (d) of FIG. 7. The mark M1 here shows a right-pointing arrow that suggests that the pointing element be moved rightward.

On the contrary, when the pointing element is positioned outside the detection range covered by the proximity sensor 17 to the right of the detection range, the display control section 32 controls the display panel 16 to display the mark M2 in a color indicative of ON state based on the detected values supplied from the detecting section 331. With this, the mark M2 is displayed in orange (warning color) as illustrated in (e) of FIG. 7. The mark M2 here shows a left-pointing arrow that suggests that the pointing element be moved leftward.

Even if the pointing element is at a position that selects the key K3, when the pointing element is too close to the proximity sensor 17, the display control section 32 controls the display panel 16 to display the keys K1, K2, and K4 in a color that is indicative of inoperable state (e.g., orange), based on the detected values supplied from the detecting section 331. With this, the keys K1, K2, and K4 are displayed in orange (warning color) as illustrated in (f) of FIG. 7, whereas the key K3 is displayed in a color that is indicative of selected state (yellow).

When the pointing element is positioned outside the detection range covered by the proximity sensor 17 and deviating upward from the detection range, the display control section 32 controls the display panel 16 to display the marks M1 and M2 in a color indicative of ON state (e.g., orange) based on the detected values supplied from the detecting section 331. With this, the marks M1 and M2 are displayed in orange as illustrated in (g) of FIG. 7. The marks M1 and M2 here each show a down-pointing arrow that suggests that the pointing element be moved downward.

On the contrary, when the pointing element is positioned outside the detection range covered by the proximity sensor 17 and deviating downward from the detection range, the display control section 32 controls the display panel 16 to display the marks M1 and M2 in a color indicative of ON state based on the detected values supplied from the detecting section 331. With this, the marks M1 and M2 are displayed in orange as illustrated in (h) of FIG. 7. The marks M1 and M2 here each show an up-pointing arrow that suggests that the pointing element be moved upward.

Note that a method of switching between touch input and gesture input is not limited to a particular kind, because the switching can be carried out by various methods. Examples include the following methods.

A first method is as follows: the switch screen is displayed and gesture input is enabled when the pointing element has entered the detection range (the example illustrated in FIG. 6); and the switch screen is erased and gesture input is disabled when the pointing element has gone out of the detection range. When gesture input is enabled, touch input may be disabled or may be kept enabled.

A second method is as follows: the switch screen is displayed when the main screen is touched in a predetermined manner; and the switch screen is erased when the main screen is touched in a predetermined manner. While the switch screen is being displayed, both gesture input and touch input are enabled.

By either of the two methods, it is possible to carry out touch input when it is not necessary to carry out gesture input.

The following description will discuss states when key operations are carried out through use of the proximity sensor 17.

FIG. 8 is a state transition diagram illustrating possible states of control by the proximity action control section 33 of the programmable display device 1.

In the following description, 1pdf{x1,x2,y1,y2}, C1f_nearWarnLevel, C0a_minLevel, and CPa_maxLevel are used.

The 1pdf{x1,x2,y1,y2} is constituted by four detected values obtained by the proximity sensor 17.

The C1f_nearWarnLevel is a threshold based on which whether or not the pointing element is too close to the proximity sensor 17 is determined.

The C0a_minLevel is a threshold based on which whether or not the pointing element is too far from the proximity sensor 17 is determined. The CPa_maxLevel is a threshold based on which whether or not the pointing element is too close to the proximity sensor 17 is determined.

As illustrated in FIG. 8, first, S0_hunt state is the start state. In the S0_hunt state, if any of the values of the 1pdf{x1,x2,y1,y2} is greater than the C1f_nearWarnLevel, this means that the pointing element is too close to the proximity sensor 17, and therefore a state transition occurs to S1C_tooNearWarn and a warning is issued.

If all the values of the 1pdf{x1,x2,y1,y2} are less than the C0a_minLevel, this means that the pointing element is too far from the proximity sensor 17, and therefore a state transition occurs to S1B_tooFar and a warning is issued.

If the speed of movement (speed of change in position) of the pointing element in a downward direction has exceeded a preset value, the detected values in the X, Y, and Z directions at that time are recorded as initial values, and a state transition occurs to S2_inVAct where recognition of the movement of the pointing element will be started.

In cases other than the above states, a state transition occurs to S1A_fKeyChg where key identification will be carried out based on a horizontal movement of the pointing element.

The movement of the pointing element is recognized in the following manner in order that no reactions will be made in response to preparations for operation or unintended movement of the pointing element.

First, when the speed of the movement in the downward Y direction has become less than a preset value, a state transition occurs to S0_hunt.

When a key ID that identifies a key is outside a predetermined range (i.e., the range of from 1 to N, where N is the number of keys), the state remains in S0_hunt. When the speed in the Y direction is greater than a value obtained by multiplying the speed in the X direction by a preset value (if the pointing element did not move vertically downward), the state remains in S0_hunt.

Next, when the key ID is effective and the pointing element has moved vertically downward, a state transition occurs to S3_VActValidated.

Furthermore, when the speed of the movement of the pointing element vertically downward has become less than a preset value, a state transition occurs to S0_hunt.

When a hand has moved away from the position represented by the initial values in the X and Z directions recorded at the transition from S0_hunt to S2_inVAct by a distance that is equal to or greater than a preset value, a state transition occurs to S0_hunt. When the hand has moved away from the position represented by the initial values in the X, Y, and Z directions recorded at the transition from S0_hunt to S2_inVAct by a distance that is equal to or greater than a preset value, a state transition occurs to S4_inVActPreRet where a movement of the pointing element back from the down position will be detected. In other cases, the state remains in S0_hunt.

In S4_inVActPreRet, if a predetermined time has passed from when the pointing element moved vertically downward, KeyDown timeout is fired and a state transition occurs to S6B_fKeyErr where an error will be warned. Also when the hand has moved away from the position represented by the initial values in the Y and Z directions by a distance that is equal to or greater than a preset value, a state transition occurs to S6B_fKeyErr.

When the polarity of the speed in the Y direction has reversed, a state transition occurs to S5_inVActRet.

In cases other than the above states, the state remains in S4_inVActPreRet.

In S5_inVActRet, if a predetermined time has passed from when the polarity of the speed in the Y direction reversed, KeyDown timeout is fired and a state transition occurs to S6B_fKeyErr where an error will be warned. Also when the hand has moved away from the position represented by the initial values in the Y and Z directions by a distance that is equal to or greater than a preset value, a state transition occurs to S6B_fKeyErr. Furthermore, when the pointing element has moved back to a distance within the detection range from the position represented by the initial values in the X, Y, and Z directions, a state transition occurs to S6A_fKeyDown which is a KeyDown state.

In cases other than the above states, the state remains in S5_inVActRet.

In S6A_fKeyDown, a flag indicative of KeyDown is set in a register provided in the programmable display device 1, and a state transition occurs to S6C_fKeyDownHoldOff. Furthermore, in S6B_fKeyErr, a flag indicative of an error is set, and a state transition occurs to S6C_fKeyDownHoldOff.

In S6C_fKeyDownHoldOff, the detecting section 331 waits until it acquires detected values from the proximity sensor 17 a predetermined number of times, and a state transition occurs to S0-hunt. The predetermined number of times is set to be less than the number of times the detecting section 331 acquires detected values from the proximity sensor 17 per second.

In S1B_tooFar, if the maximum detected value has recovered to a level that is greater by a predetermined percentage than the C0a_minLevel, a state transition occurs to S1D_fKeyChgHoldOff. Until then, the state remains in S1B_tooFar.

In S1C_tooNearWarn, if the maximum detected value has recovered to a level that is smaller by a predetermined percentage than the CPa_maxLevel, a state transition occurs to S1D_fKeyChgHoldOff. Until then, the state remains in S1C_tooNearWarn.

As has been described, the programmable display device 1 in accordance with Embodiment 1 includes: the proximity sensor 17 that detects the position of a pointing element in a three-dimensional space; and the proximity action control section 33 that processes a gesture action based on detected values detected by the proximity sensor 17.

With this, a switch indicated by the pointing element is identified and a switch-pressing action of the pointing element is detected, based on the detected values defining the position of the pointing element in a three-dimensional space. This makes it possible to simplify the configuration of the apparatus. Furthermore, since whether or not a switch-pressing action is effective is determined, malfunctions are less likely to occur. Thus, it is possible to easily realize non-contact operation of an HMI.

The detected three-dimensional position coordinates may vary due to variations that result from initial characteristics of a sensor section, changes in ambient temperature, differences in size of the pointing element, differences in beam reflectivity, and the like. Since such variations are addressed by determining the effectiveness of switch-pressing actions using relative positional coordinates, the variations are less likely to lead to malfunctions. In addition, it is highly unlikely that requirements for effectiveness of a switch-pressing action will be met in cases where, for example, a human body or a part of the human body, a moving object, or the like accidentally passes by the sensor section, the pointing element makes a preliminary action prior to operation or makes a recovering action after the operation, or the like cases. Therefore, it is unlikely that such cases will result in malfunctions. As such, it is possible to unfailingly and easily achieve the detection of non-contact actions with respect to an HMI.

Furthermore, according to the determining section 333 of the proximity action control section 33, when the pointing element has greatly changed its position in a direction other than the pressing action detecting direction because of, for example, an unintended movement of the pointing element, that movement of the pointing element is regarded as ineffective as a pressing action, and thereby misoperation of a switch can be prevented.

Furthermore, the display panel 16 is controlled by the display control section 32 to display a main screen and display, on the main screen, a switch screen in which keys are arranged in a one-dimensional direction or in two-dimensional directions in a concentrated manner.

With this arrangement, touch input is carried out in a case where touch input via the touch switches on the touch panel is available, whereas non-contact operation of the switch screen can be carried out in a case where the keys should be operated in a non-contact manner. Furthermore, the keys are arranged in a concentrated manner in the switch screen; therefore, it is not necessary to broaden the detection range covered by the sensor and also possible to reduce the amount of movement of the pointing element.

Furthermore, the display panel 16 is controlled by the display control section 32 to, when the pointing element is located outside a range where the switches are to be indicated, display the direction in which the pointing element deviates from the range on the switch screen. For example, the display panel 16 displays the direction in which the pointing element deviates from the range, as shown in display examples of the switch screen 101 of (f) to (g) of FIG. 5. Alternatively, the display panel 16 may be controlled by the display control section 32 to display a cursor (position information) indicating the position of the pointing element relative to the range or display guidance information for the pointing element to be moved into the range where the switches are to be indicated.

With such arrangements, it is possible to easily know in which direction the pointing element should be moved in order to indicate any of the keys.

Furthermore, the determining section 333 determines whether a pressing action is effective or ineffective based on whether the difference between the position of the pointing element immediately before carrying out the pressing action and the position of the pointing element which has completed the pressing action and has moved back, in the pressing action detecting direction, is within a predetermined difference range or not. Note that the determining section 333 may determine that the pressing action is effective in a case where the pointing element has moved back to the position where it used to be present immediately before carrying out the pressing action, in the pressing action detecting direction, and the pointing element has held still for a certain period of time at that position.

This makes it possible to more accurately determine whether the pressing action with respect to an alternate key is effective or ineffective.

Note that Embodiment 1has discussed an arrangement in which the proximity sensor 17 and the proximity action control section 33 are included in the programmable display device 1; however, this does not imply any limitation. The following arrangement may be employed: all or part of the proximity sensor 17 and the proximity action control section 33 is provided independently of the programmable display device 1 and is connected to the programmable display device 1 by a USB cable or the like. Such an arrangement is applied also to Embodiment 2described below.

Embodiment 2

The following description will discuss Embodiment 2 of the present invention. In Embodiment 2, members having functions identical to those described in Embodiment 1are assigned identical referential numerals, and their descriptions are omitted here.

Embodiment 1deals with arrangements in which the keys K1 to K5 in the switch screens 101 and 201 are configured as alternate switches. On the contrary, Embodiment 2deals with a switch screen in which momentary switches (keys) are provided. The momentary switches are configured to remain in their ON state while pressing action is being maintained and to be released from the ON state upon stoppage of the pressing action.

Such a switch screen has a plurality of keys arranged in a line (in one dimension) thereon (not illustrated), as with the case of the switch screens 101 and 201. The switch screen of Embodiment 2may be arranged such that, as with the case of the switch screens in Embodiment 1, the keys are arranged two-dimensionally.

The momentary keys remain in their ON state while pressing action is being maintained. Therefore, momentary keys are used to, for example, continue machine operation for a desired period of time, instead of switching the state of the key from OFF state to ON state upon a single pressing action, unlike the keys K1 to K5 of the switch screens 101 and 201.

The determining section 333 determines that the pressing action by the pointing element is effective (ON state) if the position of the pointing element in the pressing action detecting direction is maintained within a predetermined position range. On the contrary, the determining section 333 determines that the pressing action is ended (OFF state) if the position of the pressing action of the pointing element in the pressing action detecting direction falls out of the predetermined position range.

According to the above arrangement, it is possible to more accurately determine whether the pressing action with respect to a momentary switch is effective or ineffective.

[Software Implementation Example]

Control blocks of the programmable display device 1 (particularly, the operation control section 31, the display control section 32, and the proximity action control section 33) can be realized by a logic circuit (hardware) provided in an integrated circuit (IC chip) or the like or can be alternatively realized by software.

In the latter case, the programmable display device 1 includes a computer that executes instructions of a program that is software realizing the foregoing functions. The computer, for example, includes at least one processor and a computer-readable storage medium storing the program. An object of the present invention can be achieved by the processor of the computer reading and executing the program stored in the storage medium. Examples of the processor include a central processing unit (CPU).

Examples of the storage medium include "a non-transitory tangible medium" such as a read only memory (ROM), a tape, a disk, a card, a semiconductor memory, and a programmable logic circuit. The computer may further include a random access memory (RAM) or the like in which the program is loaded.

The program can be supplied to or made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

It should be noted that all or part of the detecting section 331, the calculating section 332, and the determining section 333, which are included in the proximity action control section 33, may be replaced with an inference engine using machine learning or the like.

Aspects of the present invention can also be expressed as follows:

An action processing apparatus in accordance with an aspect of the present invention includes: a display section configured to display one or more switches; a sensor section that is provided near the display section and that is configured to (i) detect a position of a pointing element in a three-dimensional space and (ii) output three detected values in three directions indicative of the position thus detected; a detecting section configured to (i) identify, based on one or two first detected values of the three detected values, one switch of the one or more switches that is indicated by the pointing element, the one or two first detected values being a value(s) in one or two of the three directions, the one or two of the three directions being referred to as at least one identification direction, and (ii) detect a pressing action with respect to the one switch based on a second detected value, the second detected value being a value in another one of the three directions other than the at least one identification direction, the another one of the three directions being referred to as a pressing action detecting direction; a calculating section configured to calculate an amount of movement of the pointing element in the pressing action detecting direction based on a change in the second detected value corresponding to a change in position of the pointing element in the pressing action detecting direction; and a determining section configured to (i) determine that the pressing action with respect to the one switch by the pointing element is effective if the amount of movement is within a predetermined amount range and (ii) determine that the pressing action is ineffective if the amount of movement is outside the predetermined amount range.

According to the above arrangement, a switch indicated by the pointing element is identified and a switch-pressing action of the pointing element is detected, based on the detected values defining the position of the pointing element in a three-dimensional space. This eliminates the need for a large-scale, high-performance system. Furthermore, since whether or not a switch-pressing action is effective is determined, malfunctions are less likely to occur. Thus, it is possible to easily realize non-contact operation of an HMI.

Furthermore, even if a change occurs in three-dimensional position coordinates due to some cause, since the effectiveness of switch-pressing actions is determined using relative positional coordinates, such a change is less likely to lead to malfunctions. In addition, it is highly unlikely that requirements for effectiveness of a switch-pressing action will be met in cases where, for example, a human body or a part of the human body or the like accidentally passes by the sensor section, the pointing element makes a preliminary action prior to operation or makes a recovering action after the operation, or the like cases. Therefore, it is unlikely that such cases will result in malfunctions. As such, it is possible to unfailingly and easily achieve the detection of non-contact actions with respect to an HMI.

The action processing apparatus may be arranged such that: the calculating section is configured to further calculate a speed of movement of the pointing element in the pressing action detecting direction based on the change in the second detected value corresponding to the change in position of the pointing element in the pressing action detecting direction; and the determining section is configured to (i) determine that the pressing action with respect to the one switch by the pointing element is effective if the amount of movement is within the predetermined amount range and the speed of movement is within a predetermined speed range and (ii) determine that the pressing action is ineffective if the amount of movement is outside the predetermined amount range or the speed of movement is outside the predetermined speed range.

According to the above arrangement, it is possible to more accurately determine whether the pressing action of the pointing element with respect to a switch is effective or ineffective.

The action processing apparatus is arranged such that the determining section is configured such that: when the at least one identification direction is two identification directions, the determining section determines that the pressing action is effective if an amount of displacement of the pointing element in each of the two identification directions is equal to or less than a corresponding predetermined value; and when the at least one identification direction is one identification direction, the determining section determines that the pressing action is effective if an amount of displacement of the pointing element in the one identification direction is equal to or less than a predetermined value.

According to the above arrangement, when the amount of displacement of the pointing element in the identification direction(s) is not large unlike the case of unintended movement of the pointing element, the displacement movement of the pointing element is regarded as effective as a pressing action. Note that, among the three directions, a direction that is related neither to switch identification nor switch pressing action can also be used in the determination. This makes it possible to prevent the misoperation of the switches to a greater extent.

The action processing apparatus may be arranged such that the determining section is configured to (i) determine that the pressing action is effective if a difference between a first position of the pointing element immediately before carrying out the pressing action and a second position of the pointing element which has completed the pressing action and has moved back, in the pressing action detecting direction, is within a predetermined difference range and (ii) determine that the pressing action is ineffective if the difference is outside the predetermined difference range.

According to the above arrangement, it is possible to more accurately determine whether a pressing action with respect to an alternate switch, a one-shot switch, or the like is effective or ineffective.

The action processing apparatus may be arranged such that: the one or more switches are configured to remain in ON state while the pressing action is being maintained and to be released from the ON state upon stoppage of the pressing action; and the determining section is configured to (i) determine that the pressing action by the pointing element is effective if a position of the pointing element in the pressing action detecting direction is maintained within a predetermined position range and (ii) determine that the pressing action is ended if the position of the pointing element in the pressing action detecting direction falls out of the predetermined position range.

According to the above arrangement, it is possible to more accurately determine whether a pressing action with respect to a momentary switch is effective or ineffective.

The action processing apparatus may be arranged such that the action processing apparatus further includes a touch panel that is disposed on the display section and that is configured to receive touch input, and the display section is configured to (i) display a main screen that contains a touch switch that is configured to receive touch input via the touch panel and (ii) display a switch screen on the main screen, the switch screen being a screen in which the one or more switches are arranged in a concentrated manner along a one-dimensional direction or two-dimensional directions.

According to the above arrangement, touch input can be carried out in a case where touch input via the touch switches is available, whereas non-contact operation of the switch screen can be carried out in a case where the switches should be operated in a non-contact manner. Furthermore, the switches are arranged in a concentrated manner in the switch screen; therefore, it is not necessary to broaden the detection range covered by the sensor section or increase the resolution of the sensor section.

The action processing apparatus may be arranged such that the display section is configured such that, if the pointing element is located at a position outside a range in which the one or more switches are to be indicated, the display section displays, on the switch screen, (i) a direction in which the pointing element deviates from the range, (ii) position information indicative of the position of the pointing element relative to the range, or (iii) guidance information for the pointing element to be moved from the position into the range.

According to the above arrangement, (i) a direction in which the pointing element deviates from the range where the switches are to be indicated, (ii) position information indicative of the position of the pointing element relative to the range, or (iii) guidance information for the pointing element to be moved from the position into the range, is displayed. This makes it possible to easily know in which direction the pointing element should be moved in order to indicate any of the switches.

The action processing apparatus may be arranged such that the sensor section includes: a sensor that is capable of measuring a degree of proximity and displacements in two orthogonal directions; and a processing section configured to convert measured values supplied from the sensor into three-dimensional coordinates.

[Remarks]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 programmable display device (action processing apparatus)
15 touch panel
16 display panel (display section)
17 proximity sensor (sensor section)
100, 200 main screen
101, 201 switch screen
204 set value indicator (touch switch)
205 start switch (touch switch)
206 stop switch (touch switch)
207 high-speed operation selecting switch (touch switch)
208 low-speed operation selecting switch (touch switch)
211 to 213 process selecting switches (touch switches)
331 detecting section
332 calculating section
333 determining section
K1 to K5 keys (switches)

The invention claimed is:

1. An action processing apparatus, comprising:
a display section configured to display one or more switches;
a sensor section provided near the display section, the sensor section configured to (i) detect a position of a pointing element in a three-dimensional space and (ii) output three detected values in three directions indicative of the detected position;
a detecting section configured to (i) identify, based on one or two first detected values of the three detected values, one switch of the one or more switches that is indicated by the pointing element, the one or two first detected values being value(s) in one or two of the three directions, the one or two of the three directions being referred to as at least one identification direction, and (ii) detect a pressing action with respect to the one switch based on a second detected value, the second detected value being a value in another one of the three directions other than the at least one identification direction, the another one of the three directions being referred to as a pressing action detecting direction;
a calculating section configured to calculate an amount of movement of the pointing element in the pressing action detecting direction based on a change in the second detected value corresponding to a change in position of the pointing element in the pressing action detecting direction; and
a determining section configured to (i) determine that the pressing action with respect to the one switch by the pointing element is effective if the amount of movement is within a predetermined amount range and (ii) determine that the pressing action is ineffective if the amount of movement is outside the predetermined amount range.

2. The action processing apparatus according to claim 1, wherein:
the calculating section is configured to further calculate a speed of movement of the pointing element in the pressing action detecting direction based on the change in the second detected value corresponding to the change in position of the pointing element in the pressing action detecting direction; and
the determining section is configured to (i) determine that the pressing action with respect to the one switch by the pointing element is effective if the amount of movement is within the predetermined amount range and the speed of movement is within a predetermined speed range and (ii) determine that the pressing action is ineffective if the amount of movement is outside the predetermined amount range or the speed of movement is outside the predetermined speed range.

3. The action processing apparatus according to claim 1, wherein the determining section is configured to:
determine, when the at least one identification direction is two identification directions, that the pressing action is effective if an amount of displacement of the pointing element in each of the two identification directions is equal to or less than a corresponding predetermined value; and
determine, when the at least one identification direction is one identification direction, that the pressing action is effective if an amount of displacement of the pointing element in the one identification direction is equal to or less than a predetermined value.

4. The action processing apparatus according to claim 1, wherein the determining section is configured to (i) determine that the pressing action is effective if a difference between a first position of the pointing element immediately before carrying out the pressing action and a second position of the pointing element which has completed the pressing action and has moved back, in the pressing action detecting direction, is within a predetermined difference range and (ii) determine that the pressing action is ineffective if the difference is outside the predetermined difference range.

5. The action processing apparatus according to claim 1, further comprising a touch panel disposed on the display section and configured to receive touch input, the display section being configured to (i) display a main screen that contains a touch switch configured to receive touch input via the touch panel and (ii) display a switch screen on the main screen when the sensor section detects the pointing element, but display no switch screen on the main screen when the sensor section detects no pointing element, the switch screen being a screen in which the one or more switches are arranged in a concentrated manner along a one-dimensional direction or two-dimensional directions.

6. The action processing apparatus according to claim 1, wherein the sensor section includes:
   a sensor configured to measure a degree of proximity and displacements in two orthogonal directions; and
   a processing section configured to convert measured values supplied from the sensor into three-dimensional coordinates.

7. An action processing apparatus, comprising:
   a display section configured to display one or more switches;
   a sensor section provided near the display section, the sensor section configured to (i) detect a position of a pointing element in a three-dimensional space and (ii) output three detected values in three directions indicative of the detected position;
   a detecting section configured to (i) identify, based on one or two first detected values of the three detected values, one switch of the one or more switches that is indicated by the pointing element, the one or two first detected values being value(s) in one or two of the three directions, the one or two of the three directions being referred to as at least one identification direction, and (ii) detect a pressing action with respect to the one switch based on a second detected value, the second detected value being a value in another one of the three directions other than the at least one identification direction, the another one of the three directions being referred to as a pressing action detecting direction;
   a calculating section configured to calculate an amount of movement of the pointing element in the pressing action detecting direction based on a change in the second detected value corresponding to a change in position of the pointing element in the pressing action detecting direction; and
   a determining section configured to (i) determine that the pressing action with respect to the one switch by the pointing element is effective if the amount of movement is within a predetermined amount range and (ii) determine that the pressing action is ineffective if the amount of movement is outside the predetermined amount range, wherein
   the one or more switches are configured to remain in an ON state while the pressing action is being maintained and to be released from the ON state upon stoppage of the pressing action, and the determining section is configured to (i) determine that the pressing action by the pointing element is effective if a position of the pointing element in the pressing action detecting direction is maintained within a predetermined position range and (ii) determine that the pressing action is ended if the position of the pointing element in the pressing action detecting direction falls out of the predetermined position range.

8. An action processing apparatus comprising:
   a display section configured to display one or more switches;
   a touch panel disposed on the display section and configured to receive touch input;
   a sensor section provided near the display section, the sensor section configured to (i) detect a position of a pointing element in a three-dimensional space and (ii) output three detected values in three directions indicative of the detected position;
   a detecting section configured to (i) identify, based on one or two first detected values of the three detected values, one switch of the one or more switches that is indicated by the pointing element, the one or two first detected values being value(s) in one or two of the three directions, the one or two of the three directions being referred to as at least one identification direction, and (ii) detect a pressing action with respect to the one switch based on a second detected value, the second detected value being a value in another one of the three directions other than the at least one identification direction, the another one of the three directions being referred to as a pressing action detecting direction;
   a calculating section configured to calculate an amount of movement of the pointing element in the pressing action detecting direction based on a change in the second detected value corresponding to a change in position of the pointing element in the pressing action detecting direction; and
   a determining section configured to (i) determine that the pressing action with respect to the one switch by the pointing element is effective if the amount of movement is within a predetermined amount range and (ii) determine that the pressing action is ineffective if the amount of movement is outside the predetermined amount range, wherein
   the display section is configured to (i) display a main screen that contains a touch switch configured to receive touch input via the touch panel and (ii) display a switch screen on the main screen, the switch screen being a screen in which the one or more switches are arranged in a concentrated manner along a one-dimensional direction or two-dimensional directions, and
   the display section is further configured to, if the pointing element is located at a position outside a range in which the one or more switches are to be indicated, display on the switch screen, (i) a direction in which the pointing element deviates from the range, (ii) position information indicative of the position of the pointing element relative to the range, or (iii) guidance information for the pointing element to be moved from the position into the range.

* * * * *